(12) United States Patent
Khandelwal et al.

(10) Patent No.: US 12,242,973 B2
(45) Date of Patent: Mar. 4, 2025

(54) GRAPH CONTEXT-BASED OPERATOR CHECKS TO IMPROVE GRAPH CLUSTERING AND EXECUTION IN AI ACCELERATOR FRAMEWORK INTEGRATION

(71) Applicant: Intel Corporation, Santa Clara, CA (US)

(72) Inventors: Chandrakant Khandelwal, Bengaluru (IN); Ritesh Kumar Rajore, Bengaluru (IN); Laxmi Ganesan, Bengaluru (IN); Sai Jayanthi, Bengaluru (IN); Yamini Nimmagadda, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 17/402,114

(22) Filed: Aug. 13, 2021

(65) Prior Publication Data

US 2021/0374554 A1    Dec. 2, 2021

(51) Int. Cl.
*G06N 3/10* (2006.01)
*G06F 8/41* (2018.01)
*G06F 9/445* (2018.01)
*G06F 16/901* (2019.01)

(52) U.S. Cl.
CPC ............... *G06N 3/10* (2013.01); *G06F 8/427* (2013.01); *G06F 8/443* (2013.01); *G06F 9/44542* (2013.01); *G06F 16/9024* (2019.01)

(58) Field of Classification Search
CPC ....... G06N 3/10; G06F 16/9024; G06F 8/427; G06F 8/443; G06F 9/44542
See application file for complete search history.

(56) References Cited

U.S. PATENT DOCUMENTS

2020/0125469 A1* 4/2020 Savolainen .......... G06F 11/3428
2020/0301972 A1* 9/2020 Wang .................... G06N 20/10

* cited by examiner

*Primary Examiner* — Ziaul A Chowdhury
(74) *Attorney, Agent, or Firm* — Jordan IP Law, LLC

(57) ABSTRACT

Systems, apparatuses and methods may provide for technology that parses, at runtime, a deep learning graph in topological order to identify a plurality of nodes, marks a first set of nodes in the plurality of nodes as unsupported by target hardware, and marks a second set of nodes in the plurality of nodes as supported by the target hardware, wherein the first set of nodes and the second set of nodes are marked based on one or more attributes defining operation functionality, and wherein the one or more attributes include one or more of an input node parameter, a dimension, or a shape.

16 Claims, 8 Drawing Sheets

GRAPH CONTEXT-BASED OPERATOR CHECKS TO IMPROVE GRAPH CLUSTERING AND EXECUTION IN AI ACCELERATOR FRAMEWORK INTEGRATION

CROSS-REFERENCE TO RELATED APPLICATIONS

The present application claims the benefit of priority to Indian Provisional Patent Application No. 202141026071, filed Jun. 11, 2021.

TECHNICAL FIELD

This disclosure relates generally to artificial intelligence (AI). More particularly, this disclosure relates to graph context-based operator checks to improve graph clustering and execution in AI accelerator framework integration.

BACKGROUND OF THE DISCLOSURE

Popular deep learning frameworks (e.g., TENSORFLOW, ONNX-RUNTIME, etc.) may provide a default runtime that can execute a graph on a host machine (e.g., central processing unit/CPU). Along with this, frameworks may provide an option for a user to run a deep learning graph on other target hardware (e.g., CPU, graphics processing unit/GPU, hardware accelerators, etc.). The other target hardware can be configured as additional execution engines where one can schedule to run a deep learning model graph.

BRIEF DESCRIPTION OF THE DRAWINGS

So that the manner in which the features of the present embodiments can be understood in detail, a more particular description of the embodiments may be had by reference to embodiments in the following detailed description, some of which are illustrated in the appended drawings. It is to be noted, however, that the appended drawings illustrate only typical embodiments and are therefore not to be considered limiting of its scope.

DETAILED DESCRIPTION

Figure 1:
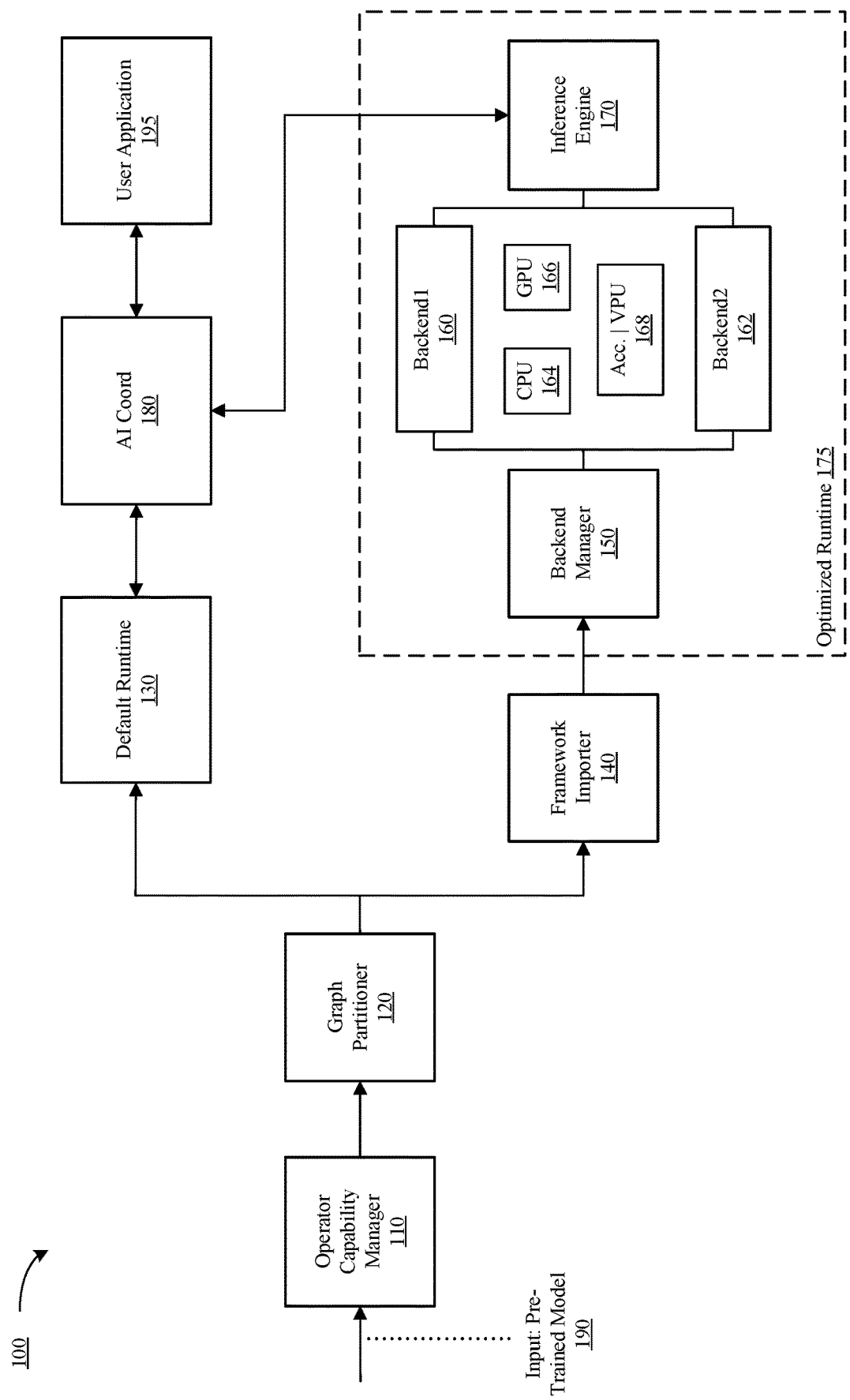
FIG. 1 is a block diagram of an example of an AI framework integration system according to an embodiment.

FIG. 1 provides a block diagram illustrating an example of an artificial intelligence (AI) framework integration system 100 according to one or more embodiments, with reference to components and features described herein including but not limited to the figures and associated description. As shown in FIG. 1, the system 100 includes an operator capability manager 110, a graph partitioner 120, a default runtime 130, a framework importer 140, a backend manager 150, a first backend (backend1) 160, a second backend (backend2) 162, hardware execution units including a central processing unit (CPU) 164, a graphics processing unit (GPU) 166, and a hardware accelerator such as a vision processing unit (VPU) 168 (or another type of hardware AI accelerator), an inference engine 170 and an AI coordinator 180. It is understood that a variety of hardware execution units including a plurality of CPUs 164, GPUs 166 and/or VPUs 168 can be employed in the system 100. It is further understood that a variety of backends can be included in the system 100. Together, the backend manager 150, the first backend (backend1) 160, the second backend (backend2) 162, the hardware execution units (including one or more CPUs 164, one or more GPUs 166, and one or more VPUs 168) and the inference engine 170 form an optimized runtime 175.

The system 100 receives as input a pre-trained model 190. The pre-trained model 190 can be developed using an AI framework from a variety of sources, including, for example, TENSORFLOW, ONNX Runtime, PYTORCH, etc. The pre-trained model 190 typically includes information and data regarding the model architecture (i.e., graph), including nodes, operators, weights and biases. Each node in a model graph represents an operation (e.g., mathematical, logical operator, etc.) which is evaluated at runtime.

The operator capability manager 110 receives the input pre-trained model 190 and analyzes the operators in the model to determine which operators or nodes are supported, and under what conditions, by the available backend technology and hardware units. The analysis includes evaluating the operators, attributes, data types, and input nodes. The operator capability manager 110 marks the operators or nodes as supported or unsupported.

The graph partitioner 120 takes the pretrained model architecture, as marked by the operator capability manager 110, and partitions (e.g., divides) the model into subgraphs (i.e., groups of operators, or clusters). The subgraphs are allocated into two groups—supported subgraphs and unsupported subgraphs. Supported subgraphs are those subgraphs having operators or nodes that are supported by the available backend technology and hardware units under the conditions present in the model. Unsupported subgraphs are those subgraphs having operators or nodes that are not supported by the available backend technology and hardware units under the conditions present in the model. Supported subgraphs are designated for further processing to be run via the optimized runtime 175. Unsupported subgraphs are designated to be run via the default runtime 130. In some circumstances, the system can be "tuned" to enhance speed and efficiency in execution speed and/or memory usage by re-designating certain supported subgraphs to be executed via the default runtime 130.

The default runtime 130 is the basic runtime package provided for the AI framework corresponding to the input pre-trained model 190. The default runtime 130 executes on basic CPU hardware with no hardware accelerator support. The default runtime 130 typically includes a compiler to compile the unsupported subgraphs into executable code to be run on the basic CPU hardware.

The framework importer 140 receives supported subgraphs from the graph partitioner 120. The subgraphs are typically in a format specific to the framework used to generate the model. The framework importer 140 takes the subgraphs and generates an intermediate representation for these subgraphs, to be interpreted (i.e., read/parsed) by the optimized runtime 175. The intermediate representation produces a structured data set comprising the model architecture, metadata, weights and biases.

The backend manager 150 receives the intermediate representation of the supported model subgraphs and applies optimization techniques to optimize execution of the model using available backends and hardware options. For example, the backend manager 150 can select among available backends, (e.g., the first backend 160 or the second backend 162). In some embodiments, the first backend 160 represents a basic backend that is optimized for a particular group of hardware units. For example, where the optimized runtime 175 utilizes the Open Visual Inference and Neural network Optimization (OpenVINO) runtime technology, the first backend 160 can be the OpenVINO backend. In some embodiments, the second backend 162 can be a backend such as VAD-M, which is optimized for machine vision tasks using a VPU such as the Intel® Myriad X VPU. The selected backend compiles (via a compiler) supported subgraphs into executable code and performs optimization. The backend manager 150 also selects among the available hardware units—the CPU 164, GPU 166 and/or VPU (or AI accelerator) 168. The backend manager 150 also dispatches data to the selected backend and schedules execution (inference) of the optimized model via the inference engine 170.

The inference engine 170 controls execution of the model code on the various hardware units that are employed for the particular model optimization. The inference engine 170 reads the input data and compiled graphs, instantiates inference on the selected hardware, and returns the output of the inference.

The AI coordinator 180 coordinates execution of AI workflow requests from a user application 195. The AI workflow requests are handled between the default runtime 130 (executing code generated from unsupported subgraphs) and the optimized runtime 175 (e.g., executing code generated from supported subgraphs). In one or more embodiments, the AI coordinator 180 is integrated within the default runtime 130. In one or more embodiments, the AI coordinator 180 is integrated within the optimized runtime 175. As will be discussed in greater detail, the operator capability manager 110 marks graph nodes as supported or unsupported based on attributes such as an input node parameter, a dimension, or a shape.

In deep learning frameworks, execution of the deep learning model graph is generally a multi-step process. First, the graph is analyzed and partitioned into set of clusters (if the graph is not completely supported on the target hardware) wherein each cluster is a set of connected graph nodes that can be executed on the target hardware. Once the clusters are formed, the graph is executed in topological order, wherein created clusters are scheduled on targeted specialized hardware (HW) and the remaining non-supported nodes are scheduled to run on the default execution provider of the framework.

Figure 2:
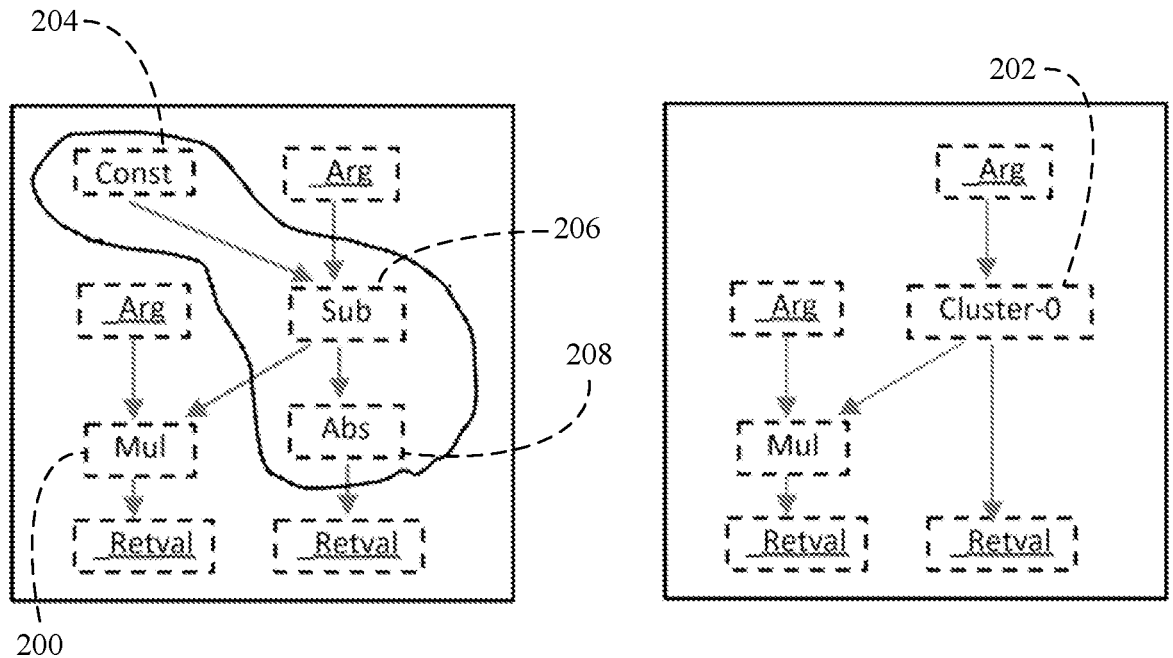
FIG. 2 is an illustration of an example of a cluster formation according to an embodiment.

FIG. 2 shows how nodes are grouped and clusters are formed. In this process, the creation of clusters uses information such as which nodes can be executed on a target hardware. If the clusters are not formed correctly, then the process can lead to run-time errors such as crashes, hangs, sub-optimal performance, etc.

Each node in a model graph represents an operation (e.g., mathematical, logical operator, etc.), which is evaluated at runtime. Except for constant nodes, which are static data inputs, to generate an output, each node expects some input data and configuration parameters if appropriate. The process to identify and mark nodes that are supported by target hardware involves automated analysis of various parameters of the operators and the input data in required shape, size, data type, etc.

In the illustrated example, a multiplication ("Mul") node 200 is unsupported by target hardware such as, for example, the optimized runtime 175 (FIG. 1). Accordingly, a cluster 202 ("Cluster-0") may be formed from a constant ("Const") node 204, a subtraction ("Sub") node 206, and an absolute value ("Abs") node 208 that are separate from the multiplier node 200.

Below are some of the existing techniques that attempt to solve this problem:

Some frameworks may try to solve this problem offline, wherein the model graph is run through scripts and the graph is analyzed to find out if operators are supported on target hardware. Sometimes the model graph is modified to run on the target hardware. When the model is passed through scripts for analysis, the result may be a modification of the graph, which is undesirable to some user applications. Moreover, modifying the model graph may involve graph translations that impact the functionality of the operators.

In some frameworks (e.g., TENSORFLOW) involving simpler datatypes, basic op-name and attribute-based checks may be applied. With advancements in the field of deep learning, user applications deploy complex forms and patterns of model graphs. In these circumstances, traditional simpler configuration-based checks are not sufficient to identify and mark nodes that may be supported on target hardware.

In this disclosure, technology is presented to identify and mark nodes that can be executed on target hardware. The graph is parsed and analyzed in topological order to find certain set of patterns and check for specific conditions that indicate whether the given node can be executed on the target hardware.

The proposed technology helps to avoid any run time inference issues such as crashes or hangs by preventing the scheduling of un-supported operators on the target hardware. The proposed technology also helps in improving clustering algorithm performance (e.g., increasing and/or maximizing cluster size).

Figure 3:
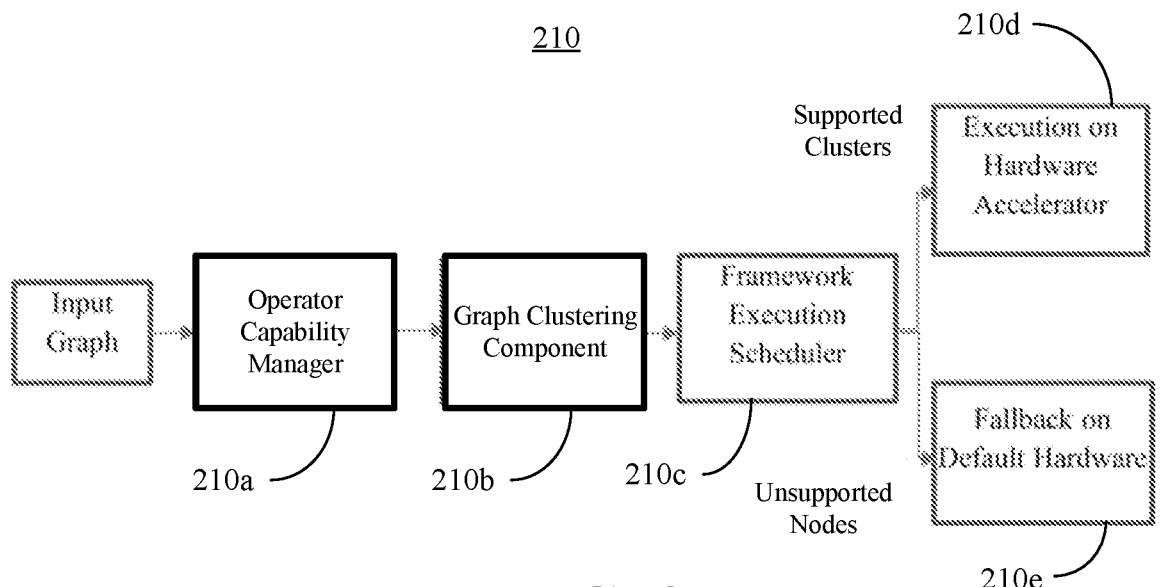
FIG. 3 is a block diagram of an example of a pipeline according to an embodiment.

FIG. 3 demonstrates a pipeline 210 (210*a*-210*e*) in which an operator capability manager 210*a* is placed in the pipeline 210 after a preprocessing stage. The operator capability manager 210*a* parses the graph in topological order and marks each operator ("op") as to whether the op is supported for the target hardware accelerator.

Figure 4:
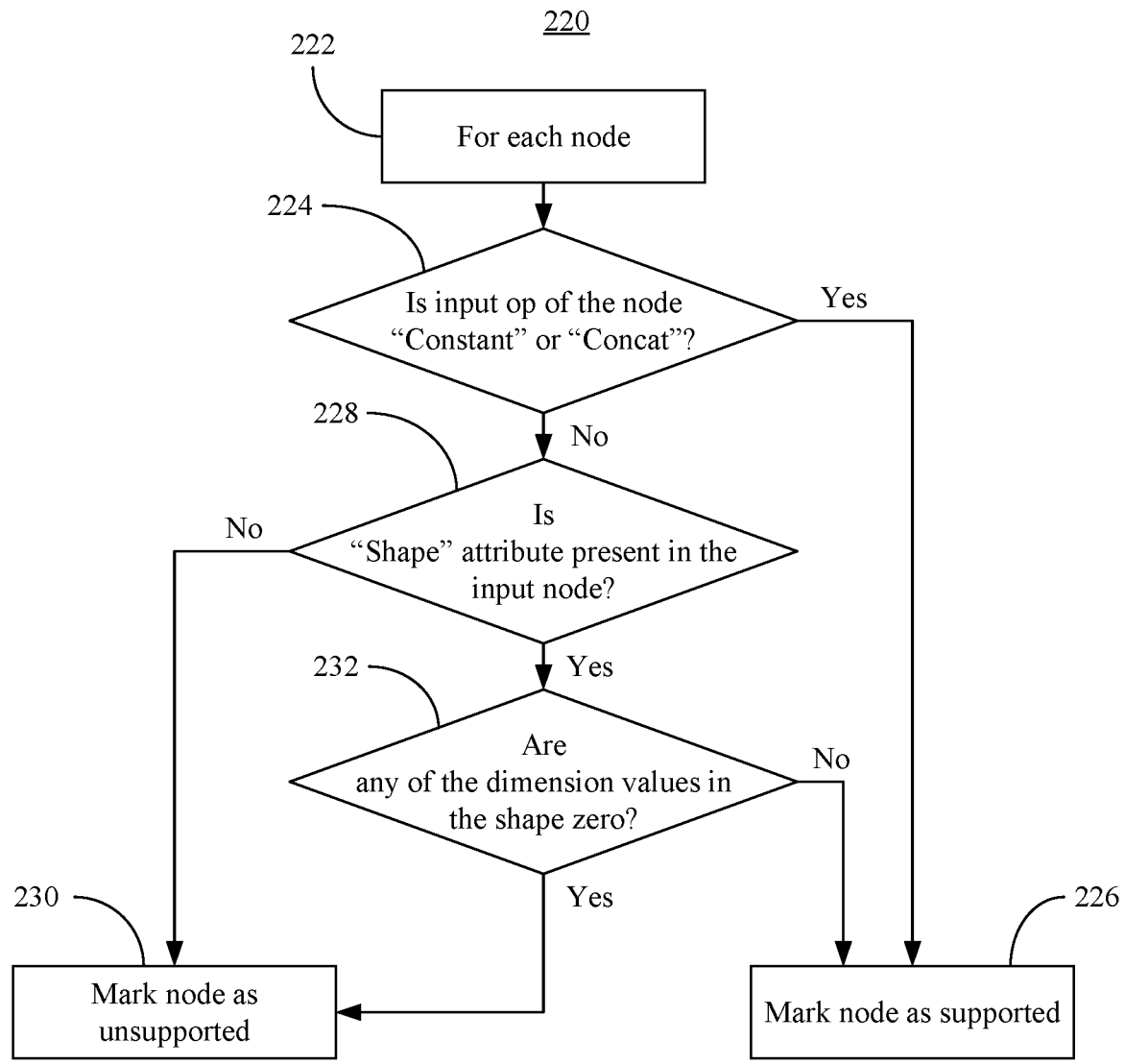
FIG. 4 is a flowchart of an example of a method of an operator check procedure according to an embodiment.

FIG. 4 shows a method 220 of an operator check procedure. The method 220 may be implemented as one or more modules in a set of logic instructions stored in a non-transitory machine—or computer-readable storage medium such as random access memory (RAM), read only memory (ROM), programmable ROM (PROM), firmware, flash memory, etc., in configurable hardware such as, for example, programmable logic arrays (PLAs), field programmable gate arrays (FPGAs), complex programmable logic devices (CPLDs), in fixed-functionality hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 220 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

In general, the method 220 checks if the input node dimension is zero for a certain combination of ops, where the node is marked as supported or un-supported based on the status of the checks. The shape attribute of an array is a tuple of integers, wherein each number in the tuple represents the lengths of the corresponding array axis (dimension). The number of elements per axis (dimension) is the dimension value. Illustrated processing block 222 selects a node from the graph and block 224 determines whether the input op of the node is a constant or a concatenation. If so, block 226 marks the node as supported. Otherwise, block 228 determines whether a shape attribute is present in the input node. If not, block 230 marks the node as unsupported. The absence of a shape attribute or zero values in the shape attribute in an op leads to runtime error during execution on the targeted hardware, unless it is a "Constant" or "Concat" op. If the shape attribute is present in the input node, block 232 determines whether any of the dimension values in the shape attribute are zero. If so, block 230 marks the node as unsupported. If none of the dimension values in the shape attribute are zero, block 226 marks the node as supported.

Figure 5:
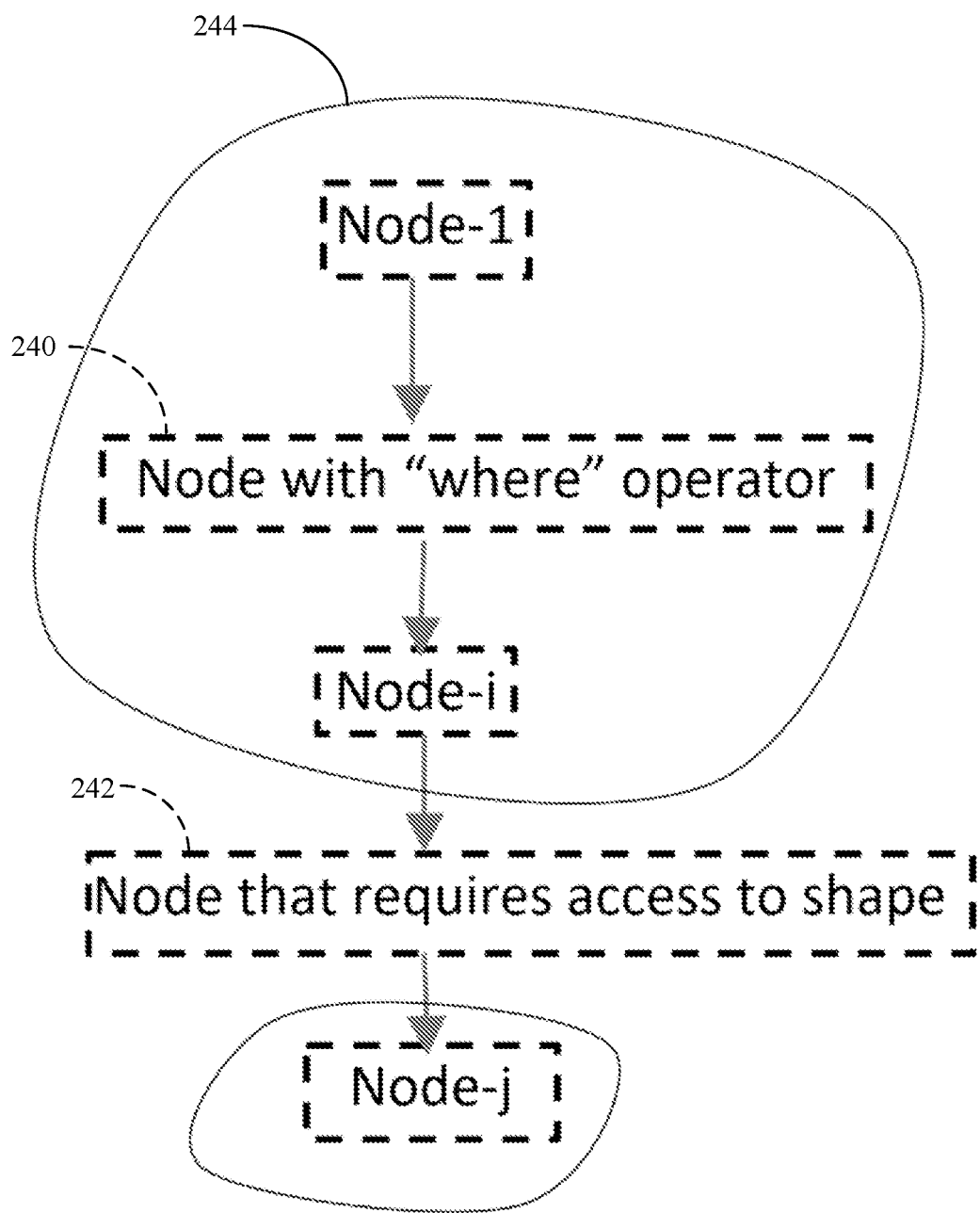
FIG. 5 is an illustration of an example of a cluster formation when an operator introduces dynamic shapes according to an embodiment.

FIG. 5 demonstrates the handling of graphs having operators that could introduce dynamic shapes. For instance, a node 240 with a "where" operator results in an output whose shape can be determined only at runtime when the node 240 is executed. If there is any subsequent node 242 in the same cluster that requires access to the shape of its input (e.g., for translating the input to the required format of the target hardware execution provider), then a runtime error will result. The proposed technology takes care of such conditions by excluding the subsequent node 242 from a cluster 244 containing the node 240, while marking the node 240 as supported.

Figure 6:
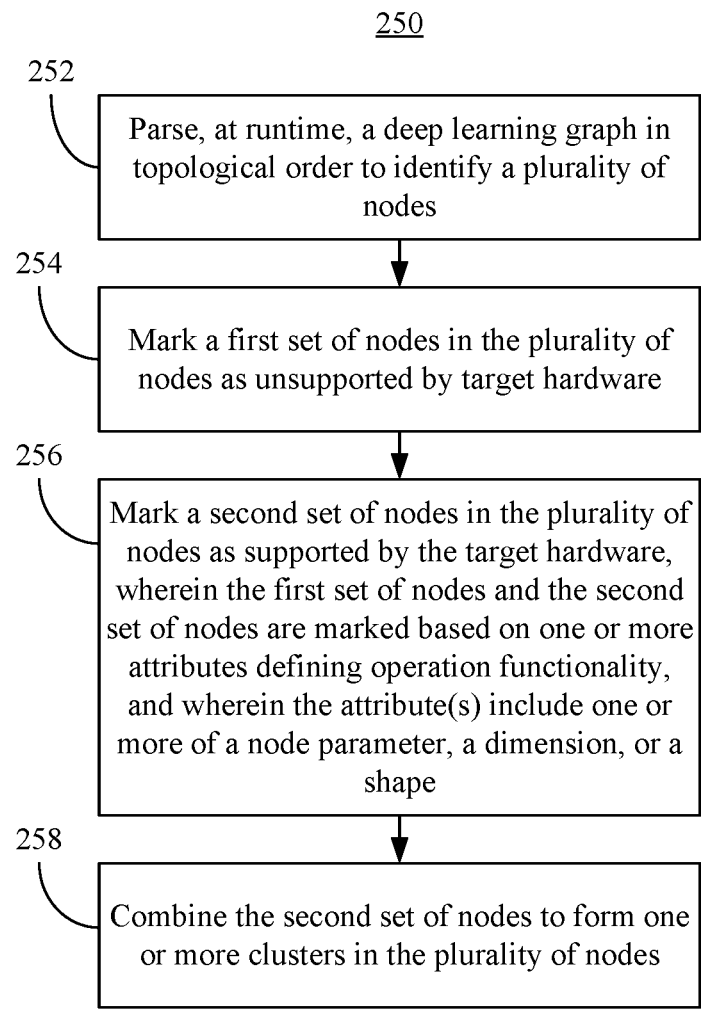
FIG. 6 is a flowchart of an example of a method of operating a performance-enhanced computing system according to an embodiment.

FIG. 6 shows a method 250 of operating a performance-enhanced computing system. The method 250 may be implemented as one or more modules in a set of logic instructions stored in a non-transitory machine—or computer-readable storage medium such as RAM, ROM, PROM, firmware, flash memory, etc., in configurable hardware such as, for example, PLAs, FPGAs, CPLDs, in fixed-functionality hardware using circuit technology such as, for example, ASIC, CMOS or TTL technology, or any combination thereof.

Illustrated processing block 252 provides for parsing, at runtime, a deep learning graph in topological order to identify a plurality of nodes. Block 254 marks a first set of nodes in the plurality of nodes as unsupported by target hardware (e.g., optimized runtime), wherein block 256 marks a second set of nodes in the plurality of nodes as supported by the target hardware. In the illustrated example, the first set of nodes and the second set of nodes are marked based on one or more attributes defining operation functionality. Additionally, the attribute(s) include one or more of an input node parameter, a dimension, or a shape. In an embodiment, block 258 combines the second set of nodes to form one or more clusters in the plurality of nodes. In such a case, the second set of nodes may be associated with nodes that maximize the size of clusters formed. Moreover, the clusters formed may improve utilization of the target hardware.

As already noted, one or more nodes in the first set of nodes may be associated with a node that lacks a shape attribute, has a shape attribute with a zero-dimension value, or introduces dynamic shape patterns that are not supported on the target hardware. Additionally, one or more nodes in the second set of nodes may be associated with a node that has one or more of a constant operator input node, an input node that has a shape attribute with no zero dimension values, or attributes supported on the target hardware.

The method 250 therefore enhances performance at least to the extent that the attributes used to mark the nodes help to avoid any runtime inference issues such as crashes or hangs (e.g., preventing the scheduling of unsupported operators on the target hardware). The method 250 also improves clustering performance by increasing and/or maximizing cluster size.

Figure 7:
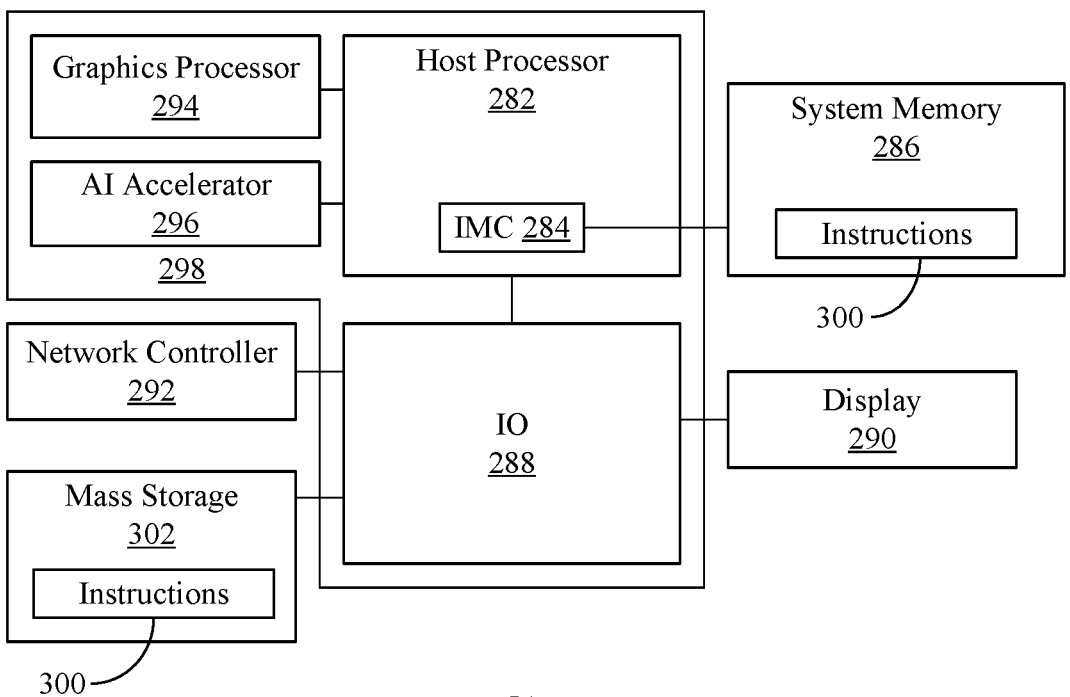
FIG. 7 is a block diagram of an example of a performance-enhanced computing architecture according to an embodiment.

Turning now to FIG. 7, a performance-enhanced computing system 280 is shown. The system 280 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof.

In the illustrated example, the system 280 includes a host processor 282 (e.g., CPU) having an integrated memory controller (IMC) 284 that is coupled to a system memory 286 (e.g., dual inline memory module/DIM M). In an embodiment, an IO module 288 is coupled to the host processor 282. The illustrated IO module 288 communicates with, for example, a display 290 (e.g., touch screen, liquid crystal display/LCD, light emitting diode/LED display), and a network controller 292 (e.g., wired and/or wireless). The host processor 282 may be combined with the IO module 288, a graphics processor 294, and an AI accelerator 296 into a system on chip (SoC) 298.

In an embodiment, the host processor 282 executes a set of program instructions 300 retrieved from mass storage 302 and/or the system memory 286 to perform one or more aspects of the method 220 (FIG. 4) and/or the method 250 (FIG. 6), already discussed. Thus, execution of the illustrated instructions 300 by the host processor 282 causes the host processor 282 to parse, at runtime, a deep learning graph in topological order to identify a plurality of nodes, mark a first set of nodes in the plurality of nodes as unsupported by target hardware, and mark a second set of nodes in the plurality of nodes as supported by the target hardware. Additionally, the first set of nodes and the second set of nodes are marked based on attributes defining operation functionality, wherein the attribute(s) include one or more of an input node parameter, a dimension, or a shape.

The computing system 280 is considered performance-enhanced at least to the extent that the attributes used to mark the nodes help to avoid any runtime inference issues such as crashes or hangs (e.g., preventing the scheduling of unsupported operators on the target hardware). The computing system 280 also improves clustering performance by increasing and/or maximizing cluster size.

Figure 8:
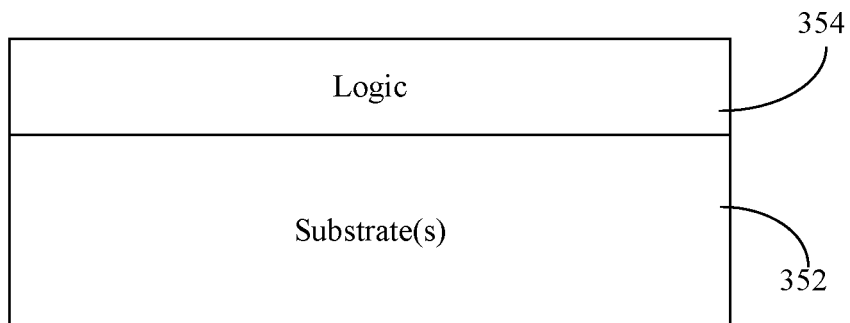
FIG. 8 is an illustration of an example of a semiconductor package apparatus according to an embodiment.

FIG. 8 shows a semiconductor apparatus 350 (e.g., chip, die, package). The illustrated apparatus 350 includes one or more substrates 352 (e.g., silicon, sapphire, gallium arsenide) and logic 354 (e.g., transistor array and other integrated circuit/IC components) coupled to the substrate(s) 352. In an embodiment, the logic 354 implements one or more aspects of the method 220 (FIG. 4) and/or the method 250 (FIG. 6), already discussed.

The logic 354 may be implemented at least partly in configurable or fixed-functionality hardware. In one example, the logic 354 includes transistor channel regions that are positioned (e.g., embedded) within the substrate(s) 352. Thus, the interface between the logic 354 and the substrate(s) 352 may not be an abrupt junction. The logic 354 may also be considered to include an epitaxial layer that is grown on an initial wafer of the substrate(s) 352.

Figure 9:
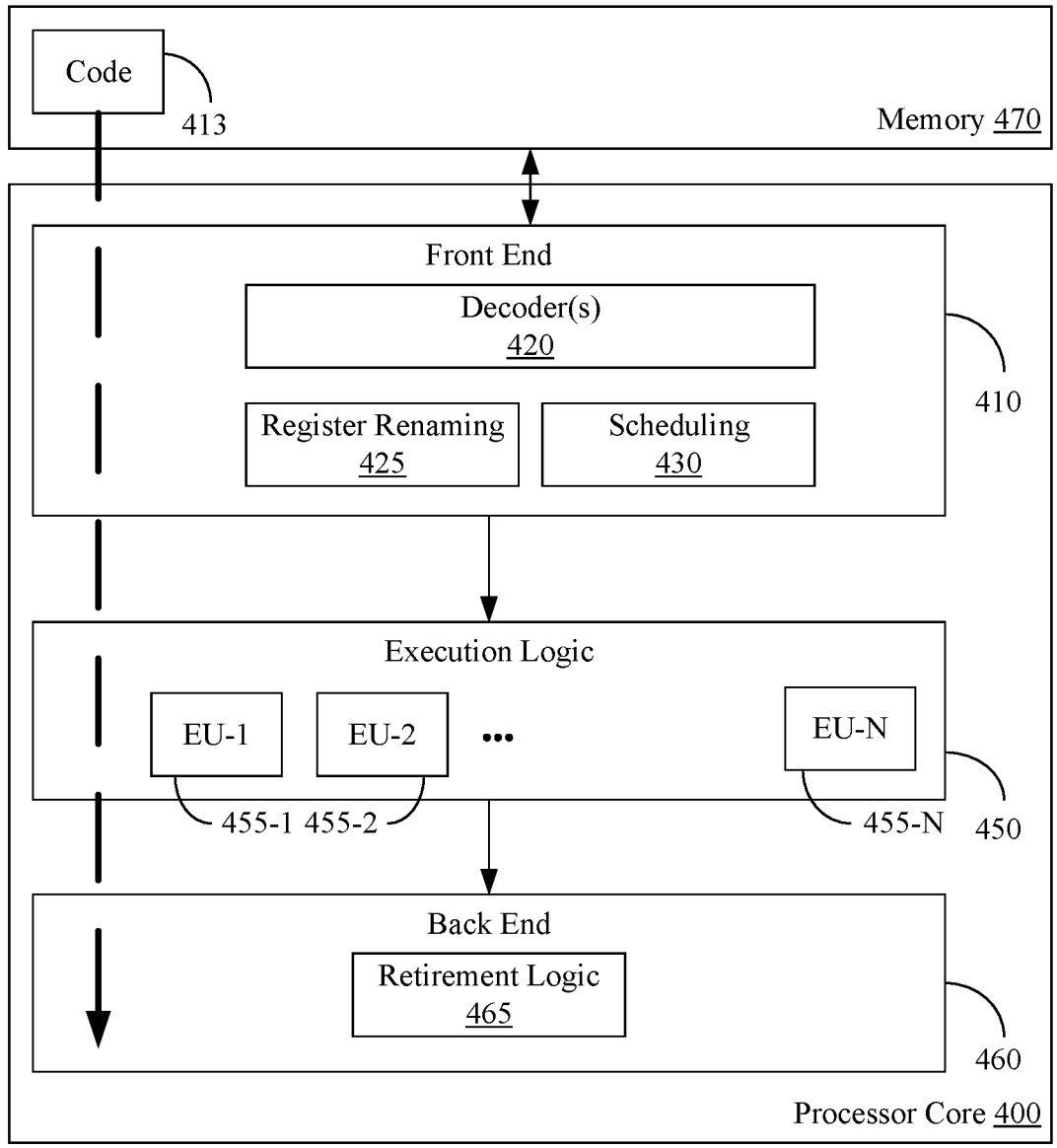
FIG. 9 is a block diagram of an example of a processor according to an embodiment.

FIG. 9 illustrates a processor core 400 according to one embodiment. The processor core 400 may be the core for any type of processor, such as a micro-processor, an embedded processor, a digital signal processor (DSP), a network processor, or other device to execute code. Although only one processor core 400 is illustrated in FIG. 9, a processing element may alternatively include more than one of the processor core 400 illustrated in FIG. 9. The processor core 400 may be a single-threaded core or, for at least one embodiment, the processor core 400 may be multithreaded in that it may include more than one hardware thread context (or "logical processor") per core.

FIG. 9 also illustrates a memory 470 coupled to the processor core 400. The memory 470 may be any of a wide variety of memories (including various layers of memory hierarchy) as are known or otherwise available to those of skill in the art. The memory 470 may include one or more code 413 instruction(s) to be executed by the processor core 400, wherein the code 413 may implement the method 220 (FIG. 4) and/or the method 250 (FIG. 6), already discussed. The processor core 400 follows a program sequence of instructions indicated by the code 413. Each instruction may enter a front end portion 410 and be processed by one or more decoders 420. The decoder 420 may generate as its output a micro operation such as a fixed width micro operation in a predefined format, or may generate other instructions, microinstructions, or control signals which reflect the original code instruction. The illustrated front end portion 410 also includes register renaming logic 425 and scheduling logic 430, which generally allocate resources and queue the operation corresponding to the convert instruction for execution.

The processor core 400 is shown including execution logic 450 having a set of execution units 455-1 through 455-N. Some embodiments may include a number of execution units dedicated to specific functions or sets of functions. Other embodiments may include only one execution unit or one execution unit that can perform a particular function. The illustrated execution logic 450 performs the operations specified by code instructions.

After completion of execution of the operations specified by the code instructions, back end logic 460 retires the instructions of the code 413. In one embodiment, the processor core 400 allows out of order execution but requires in order retirement of instructions. Retirement logic 465 may take a variety of forms as known to those of skill in the art (e.g., re-order buffers or the like). In this manner, the processor core 400 is transformed during execution of the code 413, at least in terms of the output generated by the decoder, the hardware registers and tables utilized by the register renaming logic 425, and any registers (not shown) modified by the execution logic 450.

Although not illustrated in FIG. 9, a processing element may include other elements on chip with the processor core 400. For example, a processing element may include memory control logic along with the processor core 400. The processing element may include I/O control logic and/or may include I/O control logic integrated with memory control logic. The processing element may also include one or more caches.

Figure 10:
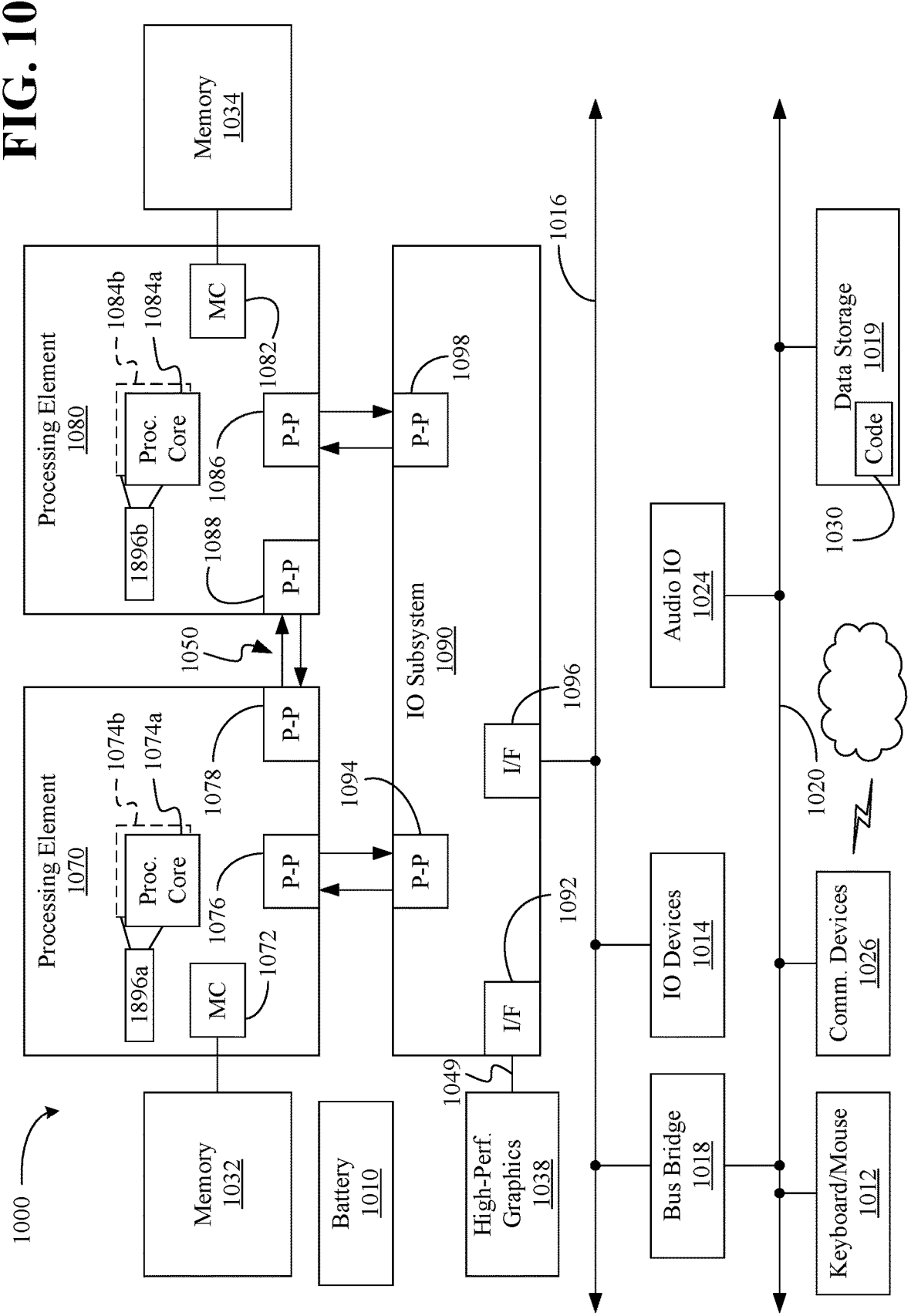
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4) or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 220 (FIG. 4) and/or the method 250 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a performance-enhanced computing system comprising a network controller and a processor coupled to the network controller, wherein the processor includes logic coupled to one or more substrates, the logic to parse, at runtime, a deep learning graph in topological order to identify a plurality of nodes, mark a first set of nodes as unsupported by target hardware, and mark a second set of nodes in the plurality of nodes as supported by the target hardware, wherein the first set of nodes and the second set of nodes are marked based on one or more attributes defining operation functionality, and wherein the one or more attributes include one or more of an input node parameter, a dimension, or a shape.

Example 2 includes the computing system of Example 1, wherein one or more nodes in the first set of nodes are to be associated with a node that lacks a shape attribute, has a shape attribute with a zero-dimension value, or introduces dynamic shape patterns that are not supported on the target hardware.

Example 3 includes the computing system of Example 1, wherein one or more nodes in the second set of nodes are to be associated with a node that has one or more of a constant operator input node, an input node that has a shape attribute with no zero dimension values, or attributes supported on the target hardware.

Example 4 includes the computing system of Example 1, wherein the logic is to combine the second set of nodes to form one or more clusters in the plurality of nodes.

Example 5 includes the computing system of any one of Examples 1 to 4, wherein the second set of nodes are to be associated with nodes that maximize a size of clusters formed.

Example 6 includes the computing system of Example 5, wherein the clusters formed improve utilization of the target hardware.

Example 7 includes a semiconductor apparatus comprising one or more substrates, and logic coupled to the one or more substrates, wherein the logic is implemented at least partly in one or more of configurable or fixed-functionality hardware, the logic to parse, at runtime, a deep learning graph in topological order to identify a plurality of nodes, mark a first set of nodes in the plurality of nodes as unsupported by target hardware, and mark a second set of nodes in the plurality of nodes as supported by the target hardware, wherein the first set of nodes and the second set of nodes are marked based on one or more attributes defining operation functionality, and wherein the one or more attributes include one or more of an input node parameter, a dimension, or a shape.

Example 8 The semiconductor apparatus of Example 7, wherein one or more nodes in the first set of nodes are to be associated with a node that lacks a shape attribute, has a shape attribute with a zero-dimension value, or introduces dynamic shape patterns that are not supported on the target hardware.

Example 9 includes the semiconductor apparatus of Example 7, wherein one or more nodes in the second set of nodes are to be associated with a node that has one or more of a constant operator input node, an input node that has a shape attribute with no zero dimension values, or attributes supported on the target hardware.

Example 10 The semiconductor apparatus of Example 7, wherein the logic is to combine the second set of nodes to form one or more clusters in the plurality of nodes.

Example 11 The semiconductor apparatus of any one of Examples 7 to 10, wherein the second set of nodes are to be associated with nodes that maximize a size of clusters formed.

Example 12 includes the semiconductor apparatus of Example 11, wherein the clusters formed improve utilization of the target hardware.

Example 13 includes the semiconductor apparatus of any one of Examples 7 to 10, wherein the logic coupled to the one or more substrates includes transistor channel regions that are positioned within the one or more substrates.

Example 14 includes at least one computer readable storage medium comprising a set of instructions, which when executed by a computing system, cause the computing system to parse, at runtime, a deep learning graph in topological order to identify a plurality of nodes, mark a first set of nodes in the plurality of nodes as unsupported by target hardware, mark a second set of nodes in the plurality of nodes as supported by the target hardware, wherein the first set of nodes and the second set of nodes are marked based on one or more attributes defining operation functionality, and wherein the one or more attributes include one or more of an input node parameter, a dimension, or a shape.

Example 15 includes the at least one computer readable storage medium of Example 14, wherein one or more nodes in the first set of nodes are to be associated with a node that lacks a shape attribute, has a shape attribute with a zero-dimension value, or introduces dynamic shape patterns that are not supported on the target hardware.

Example 16 includes the at least one computer readable storage medium of Example 14, wherein one or more nodes in the second set of nodes are to be associated with a node that has one or more of a constant operator input node, an input node that has a shape attribute with no zero dimension values, or attributes supported on the target hardware.

Example 17 includes the at least one computer readable storage medium of Example 14, wherein the instructions, when executed, further cause the computing system to combine the second set of nodes to form one or more clusters in the plurality of nodes.

Example 18 includes the at least one computer readable storage medium of any one of Examples 14 to 17, wherein the second set of nodes are to be associated with nodes that maximize a size of clusters formed.

Example 19 includes the at least one computer readable storage medium of Example 18, wherein the clusters formed improve utilization of the target hardware.

Example 20 includes a method comprising parsing, at runtime, a deep learning graph in topological order to identify a plurality of nodes, marking a first set of nodes in the plurality of nodes as unsupported by target hardware, and marking a second set of nodes in the plurality of nodes as supported by the target hardware, wherein the first set of nodes and the second set of nodes are marked based on one or more attributes defining operation functionality, and wherein the one or more attributes include one or more of an input node parameter, a dimension, or a shape.

Example 21 includes the method of Example 20, wherein one or more nodes in the first set of nodes are associated with a node that lacks a shape attribute, has a shape attribute with a zero-dimension value, or introduces dynamic shape patterns that are not supported on the target hardware.

Example 22 includes the method of Example 20, wherein one or more nodes in the second set of nodes are associated with a node that has one or more of a constant operator input node, an input node that has a shape attribute with no zero dimension values, or attributes supported on the target hardware.

Example 23 includes the method of Example 20, further including combining the second set of nodes to form one or more clusters in the plurality of nodes.

Example 24 includes the method of any one of Examples 20 to 23, wherein the second set of nodes are associated with nodes that maximize a size of clusters formed.

Example 25 includes the method of Example 24, wherein the clusters formed improve utilization of the target hardware.

Example 26 includes an apparatus comprising means for performing the method of any one of Examples 20 to 24.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and,
a memory coupled to the processor, the memory including a plurality of executable instructions which, when executed by the processor, cause the processor to:
parse a deep learning graph in topological order to identify a plurality of nodes,
mark a first set of nodes in the plurality of nodes as unsupported by target hardware, and
mark a second set of nodes in the plurality of nodes as supported by the target hardware, wherein the first set of nodes and the second set of nodes are marked based on one or more attributes defining operation functionality, wherein the one or more attributes include one or more of an input node parameter, a dimension, or a shape, and wherein one or more nodes in the second set of nodes are to be associated with a node that has one or more of a constant operator input node, an input node that has a shape attribute with no zero dimension values, or the one or more attributes supported on the target hardware.

2. The computing system of claim 1, wherein one or more nodes in the first set of nodes are to be associated with a node that lacks a shape attribute, has a shape attribute with a zero-dimension value, or introduces dynamic shape patterns that are not supported on the target hardware.

3. The computing system of claim 1, wherein the logic is to combine the second set of nodes to form one or more clusters in the plurality of nodes.

4. The computing system of claim 1, wherein the second set of nodes are to be associated with nodes that maximize a size of clusters formed.

5. The computing system of claim 4, wherein the clusters formed improve utilization of the target hardware.

6. A semiconductor apparatus comprising:
one or more substrates; and
logic coupled to the one or more substrates, wherein the logic is implemented at least partly in one or more of configurable or fixed-functionality hardware, the logic to:
parse a deep learning graph in topological order to identify a plurality of nodes;
mark a first set of nodes in the plurality of nodes as unsupported by target hardware; and
mark a second set of nodes in the plurality of nodes as supported by the target hardware, wherein the first set of nodes and the second set of nodes are marked based on one or more attributes defining operation functionality, wherein the one or more attributes include one or more of an input node parameter, a dimension, or a shape, and wherein one or more nodes in the second set of nodes are to be associated with a node that has one or more of a constant operator input node, an input node that has a shape attribute with no zero dimension values, or the one or more attributes supported on the target hardware.

7. The semiconductor apparatus of claim 6, wherein one or more nodes in the first set of nodes are to be associated with a node that lacks a shape attribute, has a shape attribute with a zero-dimension value, or introduces dynamic shape patterns that are not supported on the target hardware.

8. The semiconductor apparatus of claim 6, wherein the logic is to combine the second set of nodes to form one or more clusters in the plurality of nodes.

9. The semiconductor apparatus of claim 6, wherein the second set of nodes are to be associated with nodes that maximize a size of clusters formed.

10. The semiconductor apparatus of claim 9, wherein the clusters formed improve utilization of the target hardware.

11. The semiconductor apparatus of claim 6, wherein the logic coupled to the one or more substrates includes transistor channel regions that are positioned within the one or more substrates.

12. At least one non-transitory computer readable storage medium comprising a set of instructions, which when executed by a computing system, cause the computing system to:
parse a deep learning graph in topological order to identify a plurality of nodes;
mark a first set of nodes in the plurality of nodes as unsupported by target hardware;
mark a second set of nodes in the plurality of nodes as supported by the target hardware, wherein the first set of nodes and the second set of nodes are marked based on one or more attributes defining operation functionality, wherein the one or more attributes include one or more of an input node parameter, a dimension, or a shape, and wherein one or more nodes in the second set of nodes are to be associated with a node that has one or more of a constant operator input node, an input node that has a shape attribute with no zero dimension values, or the one or more attributes supported on the target hardware.

13. The at least one non-transitory computer readable storage medium of claim 12, wherein one or more nodes in the first set of nodes are to be associated with a node that lacks a shape attribute, has a shape attribute with a zero-dimension value, or introduces dynamic shape patterns that are not supported on the target hardware.

14. The at least one non-transitory computer readable storage medium of claim 12, wherein the instructions, when executed, further cause the computing system to combine the second set of nodes to form one or more clusters in the plurality of nodes.

15. The at least one non-transitory computer readable storage medium of claim 12, wherein the second set of nodes are to be associated with nodes that maximize a size of clusters formed.

16. The at least one non-transitory computer readable storage medium of claim 15, wherein the clusters formed improve utilization of the target hardware.

* * * * *